(12) United States Patent
Toyama

(10) Patent No.: US 6,856,463 B2
(45) Date of Patent: Feb. 15, 2005

(54) IMAGE TRANSFER DEVICE HAVING LAMINATED LENS ARRAY SHEETS

(75) Inventor: Minoru Toyama, Osaka (JP)

(73) Assignee: Nippon Sheet Glass Co., Ltd., Osaka (JP)

(*) Notice: Subject to any disclaimer, the term of this patent is extended or adjusted under 35 U.S.C. 154(b) by 17 days.

(21) Appl. No.: 10/208,815

(22) Filed: Aug. 1, 2002

(65) Prior Publication Data

US 2003/0147143 A1 Aug. 7, 2003

(30) Foreign Application Priority Data

| Aug. 1, 2001 | (JP) | P2001-233781 |
| Dec. 3, 2001 | (JP) | P2001-368488 |
| Jan. 10, 2002 | (JP) | P2002-003245 |
| Jan. 28, 2002 | (JP) | P2002-018028 |

(51) Int. Cl.[7] ............................................. G02B 27/10
(52) U.S. Cl. ....................................... 359/621; 359/622
(58) Field of Search ................................ 359/619, 621, 359/622, 625, 626

(56) References Cited

U.S. PATENT DOCUMENTS

2002/0063348 A1 * 5/2002 Imamura et al. ............. 264/1.1

FOREIGN PATENT DOCUMENTS

JP 2000352606 A * 12/2000 ............ G02B/3/00

* cited by examiner

*Primary Examiner*—Ricky Mack
(74) *Attorney, Agent, or Firm*—Whitham, Curtis & Christofferson, P.C.

(57) ABSTRACT

An image transfer device having: a lens array laminate 14 forming an erecting unit magnification optical system, the lens array laminate including a plurality of lens array sheets 12 of the same specification each of which has convex-convex lens elements 10 arranged in a plurality of rows and which are substantially closely laminated in a direction of each lens optical axis. Typically, two to four lens array sheets of the same specification each of which has convex-convex lens elements each having are fractive index of not lower than 1.45 and arranged in 3 to 9 rows are closely laminated on each other or one another in a direction of each lens optical axis. Each of the lens array sheets is preferably formed so that the lens thickness is in a range of from about 4 mm to about 0.5 mm and the number of lens rows is in a range of from 4 to 6.

23 Claims, 8 Drawing Sheets

IMAGE TRANSFER DEVICE HAVING LAMINATED LENS ARRAY SHEETS

BACKGROUND OF THE INVENTION

The present invention relates to an image transfer device having a lens array laminate forming an erecting unit magnification optical system, the lens array laminate including a plurality of lens array sheets each of which has convex-convex lens elements arranged in a plurality of rows and which are closely laminated. This device is useful for a linear scanning optical system such as an optical printer or a scanner.

A gradient index rod lens array has been heretofore often used in an image transfer device for an optical writing system such as an optical printer or for an optical reading system such as a scanner. Great reduction in size of various kinds of apparatus such as an optical printer and a scanner can be achieved by the use of such a gradient index rod lens array. When the gradient index rod lens array is used, it may be however sometimes impossible to obtain sufficient resolution for an optical system requiring a high resolution of about 1200 dpi (dots per inch) in accordance with the design thereof.

Therefore, use of a planar lens array in place of the gradient index lens array has been proposed (e.g. see Japanese Patent Laid-Open No. 2000-221445). The optical system disclosed in this official gazette is constituted by 4n spherical lens array sheets (in which n is a positive integer and, accordingly, a 4-sheet configuration is the smallest with n equal to 1) Further, the distance between adjacent lens array sheets is set to be equal to the focal length of the lens (that is, a space is formed between adjacent lens array sheets) so that a high resolution of 1200 dpi can be achieved (but the focal length and the size of the lens are not described).

A member for keeping the distance between adjacent lens array sheets constant is however required for achieving an erecting unit magnification optical system in the configuration that the distance between adjacent lens array sheets is set to be equal to the focal length of the lens. Hence, the number of parts becomes large and assembling thereof becomes complex. Moreover, positioning accuracy becomes very stringent because both reduction in thickness of each lens array sheet and reduction in distance between adjacent lens array sheets are required for achieving high resolution.

Moreover, there is a problem that the number of lens array sheets used becomes large inevitably. In this example, at least four lens array sheets are required because the optical system is constituted by 4n lens array sheets.

SUMMARY OF THE INVENTION

An object of the invention is to provide an image transfer device in which lens array sheets can be butt-positioned in a close contact configuration while the number of lens array sheets is reduced as much as possible so that easy assembling and reduction in cost and size can be achieved.

Another object of the invention is to provide an image transfer device in which the number of lens array sheets is reduced as much as possible so that easy assembling and reduction in cost and size can be achieved as well as a bright and high-resolution image can be transmitted.

According to the invention, there is provided an image transfer device having: a lens array laminate forming an erecting unit magnification optical system, the lens array laminate including a plurality of lens array sheets each of which has convex-convex lens elements arranged in a plurality of rows and which are substantially closely laminated in a direction of each lens optical axis.

Further, according to the invention, there is provided an image transfer device having: a lens array laminate forming an erecting unit magnification optical system, the lens array laminate including two to four lens array sheets of the same specification each of which has convex-convex lens elements arranged in 3 to 9 rows and which are substantially closely laminated in a direction of each lens optical axis, each of the convex-convex lens elements being made of a transparent material having a refractive index of not lower than 1.45. Accordingly, each of the lens array sheets is a plate-like body in which lens elements are arrayed two-dimensionally so that 3 to 9 rows of lens elements are arranged in a width wise direction (i.e. in a subsidiary scanning direction) while a large number of lens elements are arranged in a lengthwise direction (i.e. in a main scanning direction).

When two lens array sheets are closely laminated, preferably, each of the lens array sheets has a lens thickness of not larger than 6.3 mm while the ratio of lens aperture radius to lens thickness in each of the lens array sheets is in a range of from 0.12 to 0.20 and the ratio of convex face curvature radius to lens thickness in each of the lens array sheets is in a range of from 0.24 to 0.33. When three lens array sheets are closely laminated, preferably, each of the lens array sheets has a lens thickness of not larger than 8.0 mm while the ratio of lens aperture radius to lens thickness in each of the lens array sheets is in a range of from 0.14 to 0.22 and the ratio of convex face curvature radius to lens thickness in each of the lens array sheets is in a range of from 0.42 to 0.65. When four lens array sheets are closely laminated, preferably, each of the lens array sheets has a lens thickness of not larger than 8.0 mm while the ratio of lens aperture radius to lens thickness in each of the lens array sheets is in a range of from 0.18 to 0.29 and the ratio of convex face curvature radius to lens thickness in each of the lens array sheets is in a range of from 0.75 to 1.10.

In each of these configurations, preferably, the lens thickness of each of the lens array sheets is in a range of from about 4 mm to about 0.5 mm. Preferably, the number of lens rows is in a range of from 4 to 6. Particularly a configuration of 5 lens rows is optimal.

The image transfer device according to the invention is not particularly limited but can be used in an optically writing system for an optical printer or in an optically reading system for a scanner.

In the image transfer device described above, all lens faces may have one and the same curvature radius, but the lens faces maybe formed to have different curvature radii to improve resolution. Thus, accomplishment of the invention is concluded.

That is, the invention also provides an image transfer device having: a lens array laminate forming an erecting unit magnification optical system, the lens array laminate including three lens array sheets each of which has convex-convex lens elements arranged in a plurality of rows and which are laminated so that optical axes of corresponding lens elements coincide with one another, wherein: the lens array laminate is formed so that lens faces located on opposite sides and symmetric to each other with respect to the center of lamination are set to be equal in curvature radius to each other; and the lens array laminate satisfies the relations: R1 ≠ R2 and R2 ≠ R3 in which R1 is the curvature radius of outer lens faces in the outer lens array sheets, R2 is the curvature radius of inner lens faces in the outer lens array sheets, and R3 is the curvature radius of opposite lens faces in the intermediate lens array sheet. Preferably, configuration is made so that values of the curvature radii R1, R2 and R3 of lens faces satisfy the relation: R1<R3<R2.

In this case, the ratio R2/R1 of the curvature radius R2 of the inner lens faces in the outer lens array sheets to the curvature radius R1 of the outer lens faces in the outer lens array sheets is set to satisfy the relation:

1<R2/R1.

Preferably, the ratio R2/R1 is set to satisfy the relation:

1.1<R2/R1<10.

Further preferably, the ratio R2/R1 is set to satisfy the relation:

1.3<R2/R1<5.

In each of these configurations, preferably, the lens array sheets are substantially closely laminated while each of the lens array sheets forms a structure in which convex-convex lens elements each made of a transparent material having a refractive index of not lower than 1.45 are arranged in 3 to 9 rows, particularly in 4 to 6 rows.

The image transfer device according to the invention is not particularly limited but can be used in an optically writing system for optical printer or in an optically reading system for a scanner.

In the present invention, the lens faces may be partly or wholly shaped aspherically to more greatly improve resolution.

That is, the invention further provides an image transfer device having: a lens array laminate forming an erecting unit magnification optical system, the lens array laminate including two or three lens array sheets each of which has convex-convex lens elements arranged in a plurality of rows and which are laminated so that optical axes of corresponding lens elements coincide with one another; wherein the lens array laminate is formed so that lens faces located on opposite sides and symmetric to each other with respect to the center of lamination form a symmetrical shape and so that at least two lens faces are shaped aspherically. When the lens faces are to be partially shaped aspherically here, it is preferable that the outermost lens faces are shaped aspherically.

When the lens array laminate is constituted by two lens array sheets, preferably, the a spherical coefficient CC defining a quadratic curved face of revolution which is a base of each of the lens faces shaped aspherically satisfies the relation:

−0.6≦CC≦0.

Further, when the lens array laminate is constituted by three lens array sheets, preferably, the a spherical coefficient CC defining a quadratic curved face of revolution which is a base of each of the lens faces shaped aspherically satisfies the relation:

−5<CC<2.2.

The image transfer device according to the invention is not particularly limited but can be used in an optically writing system such as an optical printer or in an optically reading system such as a scanner.

The present disclosure relates to the subject matter contained in Japanese patent application Nos. 2001-233781 (filed on Aug. 1, 2001), 2001-368488 (filed on Dec. 3, 2001), 2002-3245 (filed on Jan. 10, 2002) and 2002-18028 (filed on Jan. 28, 2002), which are expressly incorporated herein by reference in their entireties.

DETAILED DESCRIPTION OF THE PREFERRED EMBODIMENTS

First Embodiment

Figure 1:
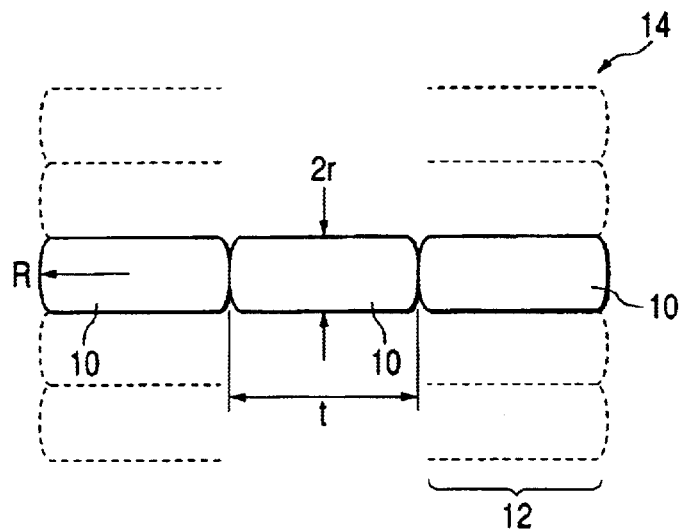
FIG. 1 is an explanatory view showing a first embodiment of an image transfer device according to the invention.

As shown in FIG. 1, the image transfer device according to the invention has a lens array laminate (a lens array stack) 14 forming an erecting unit magnification optical system, the lens array laminate 14 including a plurality of lens array sheets 12 (e.g. three lens array sheets 12 in the case shown in FIG. 1) of the same specification each of which has convex-convex lens elements 10 arranged in 3 to 9 rows and which are closely laminated in a direction of each lens optical axis. Each of the lens array sheets 12 is made of a transparent material having a refractive index of not lower than 1.45 and is provided as a plate-like body in which the lens elements 10 are arrayed two-dimensionally so that 3 to 9 rows of lens elements 10 are arranged in a widthwise direction (i.e. in an upper-and-lower direction of the paper plane of FIG. 1) while a large number of lens elements 10 are arranged in a lengthwise direction (i.e. in a perpendicular direction to the paper plane of FIG. 1). The lens elements 10 may be arranged so as to be shaped like a square or may be arranged densely. Each of the lens array sheets can be produced easily by integral molding by use of a transparent resin.

Here, a configuration in which 2 to 4 lens array sheets are laminated as the lens array sheets 12 is preferable. Theoretical resolution is improved as the number of lens sheets (i.e. the number of lens array sheets to be laminated) increases. This is because when the number of lens sheets increases, light-condensing power per lens array sheet can be reduced and, accordingly, the curvature of each convex-convex lens element can be reduced and spherical aberration can be reduced. In practice, however, the number of lens faces increases as the number of lens array sheets increases. Hence, the total quantity of transmitted light is reduced because the lens faces more or less reflect light. Moreover, it is difficult to enhance positional accuracy in lamination. Hence, resolution is apt to be lowered because of positional displacement. For these reasons, it is preferable that the number of lens array sheets to be laminated in the invention is limited to be not larger than 4. In the configuration that two lens array sheets are laminated, resolution is slightly lowered because aberration caused by spherical faces is large, but the number of parts is so small that easy assembling and reduction in cost can be achieved. From the description, the configuration that three lens array sheets are laminated is preferably used so that a bright high-resolution optical system can be achieved relatively inexpensively.

In the configuration that two lens array sheets are laminated, each of the lens array sheets is formed so that the lens thickness is not larger than 6.3 mm (particularly not larger than 3.2 mm, more particularly not larger than 1.8 mm for higher resolution), the ratio of lens aperture radius to lens thickness is in a range of from 0.12 to 0.20 and the ratio of convex face curvature radius to lens thickness is in a range of from 0.24 to 0.33. In the configuration that three lens array sheets are laminated, each of the lens array sheets is formed so that the lens thickness is not larger than 8.0 mm (particularly not larger than 4 mm, more particularly not larger than 2 mm for higher resolution), the ratio of lens aperture radius to lens thickness is in a range of from 0.14 to 0.22 and the ratio of convex face curvature radius to lens thickness is in a range of from 0.42 to 0.65. In the configuration that four lens array sheets are laminated, each of the lens array sheets is formed so that the lens thickness is not larger than 8.0 mm (particularly not larger than 4.5 mm, more particularly not larger than 2.5 mm for higher resolution), the ratio of lens aperture radius to lens thickness is in a range of from 0.18 to 0.29 and the ratio of convex face curvature radius to lens thickness is in a range of from 0.75 to 1.10.

In any one of these configurations, the lens thickness of each lens array sheet is preferably selected to be in a range of from about 4 mm to about 0.5 mm. It is preferable that the lens thickness is smaller. However, if the lens thickness is too small, it is difficult to handle the lens array sheet because the mechanical strength of the lens array sheet itself is reduced. If the lens thickness is contrariwise too large, there arises a problem in wasteful use of material, increase in thickness, and so on, as well as characteristic is not particularly improved any more.

Moreover, the invention is configured so that the respective lens array sheets are closely coupled to one another. Hence, the respective lens array sheets can be butt-positioned. There is an advantage in that no member for defining the distance between adjacent lens array sheets is required. Moreover, each lens array sheet can be made thick, so that strength after assembling can be improved.

Moreover, in the invention, each lens array sheet is constituted by 3 to 9 rows of lens elements, so that an optical system small in size, bright, and little in unevenness can be achieved. Incidentally, if 2 or less rows of lens elements are arranged, unevenness in brightness in a main scanning direction becomes large. If the operating length is made long to reduce such unevenness, the aperture in a row direction becomes so small that the lens becomes dark undesirably. A lens array little in unevenness can be achieved by increasing the number of lens rows. However, if the number of lens rows is larger than 9, the size of the optical system becomes remarkably large undesirably. From these facts, it is preferable that the number of lens rows is set to be in a range of from 4 to 6. Particularly, a configuration of 5 lens rows is optimal.

In such an optical system, reduction in aberration and enhancement of resolution can be achieved when the optical system is scaled down analogously.

EXAMPLE 1

With respect to a lens array laminate having a structure in which two lens array sheets each having a large number of convex-convex spherical lens elements arrayed were closely laminated on each other, shape sizes to achieve resolutions of 300, 600 and 1200 dpi respectively by changing the refractive index, the numerical aperture and the number of lens rows were obtained by optical design simulation. It was a matter of course that the lens size needed to be reduced as the resolution increased. Allowable size ranges in which MTF (Modulation of Transfer Function) in an erecting unit magnification lens system was kept 40% were calculated.

Conditions for simulation are as follows.

(a) The lens array laminate is an optical system which is configured so that two lens array sheets each having 3 to 7 lens rows are closely laminated on each other. The respective lens elements are arrayed so as to be adjacent to one another. Any arrangement method such as hexagonal symmetry or tetragonal symmetry may be used. Alternatively, dense arrangement may be used.

(b) The aperture of the lens array is substantially shaped like a circle to be equal in dimension both in a main scanning direction and in a subsidiary scanning direction, in order to achieve brightness.

(c) The simulation is performed on the basis of light rays effective in forming an image on the assumption that stray light can be cut off. In practice, a unit such as a light-shielding film provided between adjacent lens elements in a surface of each lens array sheet or a partition wall provided on the outside of each lens array sheet is provided to cut off stray light.

(d) Values of parameters are set as follows.
Wavelength of the light source: $\lambda=750$ nm
Radiation angle of the light source: $\theta=14°$ to $9°$
Refractive index of the lens material: $n=1.55$ to $1.45$
The number of lens rows: 7 to 3 rows (e) Lens radius r, lens thickness t, lens curvature radius R and operating length L are regarded as variables.

The procedure of the simulation is as follows.
(1) The refractive index n of the lens material is set.
(2) The lens radius r is set in consideration of resolution.
(3) The maximum operating length L is determined on the basis of combination of the radiation angle $\theta$ of the light source and the number of lens rows so that the aperture of the lens array is shaped like a circle.
(4) The lens thickness t and the curvature radius R are determined so that an inverted image can be formed in the center in the laminating direction of the lens array laminate.
(5) MTF values corresponding to 6, 12 and 24 lp/mm (linepairs per mm) equivalent to 300, 600 and 1200 dpi respectively are calculated.
(6) The size of the optical system is changed analogously to thereby obtain MTF fluctuation due to the size change.
(7) The steps (2) to (6) are repeatedly calculated while the refractive index is changed.

Results of the simulation are shown in Tables 1 to 4. Table 1 shows values of lens thickness t to make MTF 40% in accordance with each resolution in the conditions that the refractive index n is changed to 1.55, 1.5 and 1.45 and the number of lens rows is changed to 7, 5 and 3 respectively when the radiation angle $\theta$ of the light source is in a range of from $14°$ to $9°$. Table 2 collectively shows the minimum and maximum values of the lens thickness t. It is obvious from Table 2 that the lens thickness t is preferably selected to be not larger than 6.3 mm. The lens thickness t is preferably selected to be not larger than 3.2 mm or more preferably not larger than 1.8 mm as resolution is made high.

TABLE 1

| | 300 dpi | | | 600 dpi | | | 1200 dpi | | |
|---|---|---|---|---|---|---|---|---|---|
| n | 7 rows | 5 rows | 3 rows | 7 rows | 5 rows | 3 rows | 7 rows | 5 rows | 3 rows |
| | | | | 14° | | | | | |
| 1.55 | 0.8 | 1.3 | 1.5 | 0.4 | 0.7 | 0.8 | 0.3 | 0.3 | 0.4 |
| 1.5 | 0.7 | 1.2 | 1.4 | 0.4 | 0.6 | 0.7 | 0.2 | 0.3 | 0.4 |
| 1.45 | 0.6 | 1.1 | 1.3 | 0.3 | 0.6 | 0.6 | 0.2 | 0.3 | 0.3 |
| | | | | 12° | | | | | |
| 1.55 | 1.6 | 2.1 | 2.7 | 0.9 | 1.2 | 1.4 | 0.5 | 0.7 | 0.7 |
| 1.5 | 1.5 | 2.1 | 2.5 | 0.8 | 1.1 | 1.3 | 0.5 | 0.6 | 0.6 |
| 1.45 | 1.3 | 1.8 | 2.1 | 0.6 | 0.9 | 1.1 | 0.3 | 0.5 | 0.6 |
| | | | | 9° | | | | | |
| 1.55 | 4.8 | 5.8 | 6.3 | 2.6 | 3.1 | 3.2 | 1.3 | 1.8 | 1.7 |
| 1.5 | 4.4 | 5.4 | 5.6 | 2.4 | 2.9 | 2.8 | 1.2 | 1.6 | 1.5 |
| 1.45 | 3.8 | 4.2 | 5.0 | 2.1 | 2.2 | 2.6 | 1.2 | 1.3 | 1.4 |

TABLE 2

| 9 to 14°, 3 to 7 rows | | | | | |
|---|---|---|---|---|---|
| 300 dpi – t (mm) | | 600 dpi – t (mm) | | 1200 dpi – t (mm) | |
| Minimum | Maximum | Minimum | Maximum | Minimum | Maximum |
| 0.6 | 6.3 | 0.3 | 3.2 | 0.2 | 1.8 |

Table 3 collectively shows size ratios (r/t, R/t and L/t) in the conditions that the refractive index n is changed to 1.55, 1.5 and 1.45 and the number of lens rows is changed to 7, 5 and 3 respectively when the radiation angle $\theta$ of the light source is in a range of from $14°$ to $9°$. Table 4 collectively shows the minimum and maximum values of the size ratios. It is obvious from Table 4 that the ratio of lens aperture radius r to lens thickness t is preferably selected to be in a range of from 0.12 to 0.20, the ratio of convex face curvature radius R to lens thickness t is preferably selected to be in a range of from 0.24 to 0.33 and the ratio of operating length L to lens thickness t is preferably selected to be in a range of from 2.00 to 4.91.

TABLE 3

| n | r/t | | | R/t | | | L/t | | |
|---|---|---|---|---|---|---|---|---|---|
| | 7 rows | 5 rows | 3 rows | 7 rows | 5 rows | 3 rows | 7 rows | 5 rows | 3 rows |
| | | | | 14° | | | | | |
| 1.55 | 0.188 | 0.195 | 0.188 | 0.329 | 0.319 | 0.287 | 4.901 | 3.501 | 2.001 |
| 1.5 | 0.186 | 0.188 | 0.188 | 0.309 | 0.298 | 0.269 | 4.899 | 3.414 | 2.000 |
| 1.45 | 0.187 | 0.188 | 0.187 | 0.287 | 0.277 | 0.251 | 4.896 | 3.496 | 2.005 |
| | | | | 12° | | | | | |
| 1.55 | 0.161 | 0.161 | 0.161 | 0.327 | 0.315 | 0.285 | 4.903 | 3.500 | 2.000 |
| 1.5 | 0.161 | 0.161 | 0.161 | 0.307 | 0.294 | 0.266 | 4.896 | 3.500 | 2.000 |
| 1.45 | 0.161 | 0.161 | 0.161 | 0.284 | 0.275 | 0.247 | 4.899 | 3.499 | 2.000 |
| | | | | 9° | | | | | |
| 1.55 | 0.121 | 0.121 | 0.121 | 0.322 | 0.309 | 0.280 | 4.899 | 3.500 | 2.000 |
| 1.5 | 0.121 | 0.121 | 0.120 | 0.303 | 0.290 | 0.262 | 4.901 | 3.500 | 2.000 |
| 1.45 | 0.121 | 0.121 | 0.121 | 0.282 | 0.270 | 0.243 | 4.899 | 3.500 | 2.000 |

TABLE 4

| 9 to 14°, 3 to 7 rows | | | | | |
|---|---|---|---|---|---|
| r/t | | R/t | | L/t | |
| Minimum | Maximum | Minimum | Maximum | Minimum | Maximum |
| 0.120 | 0.195 | 0.243 | 0.329 | 2.000 | 4.903 |
| 0.12 | 0.20 | 0.24 | 0.33 | 2.00 | 4.91 |

Figure 2A:
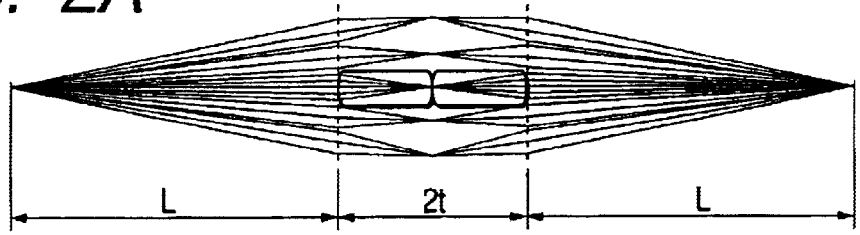
FIGS. 2A to 2C are explanatory views showing optical paths in this embodiment.
Figure 3:
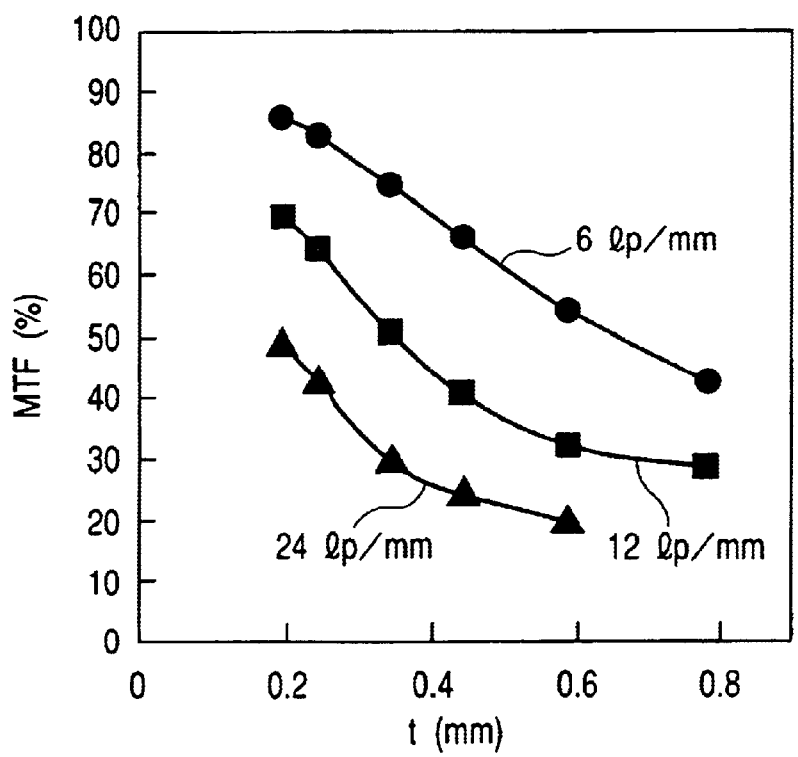
FIG. 3 is a graph showing the relation of lens thickness t to MTF in a 2-sheet lamination configuration.
Figure 4:
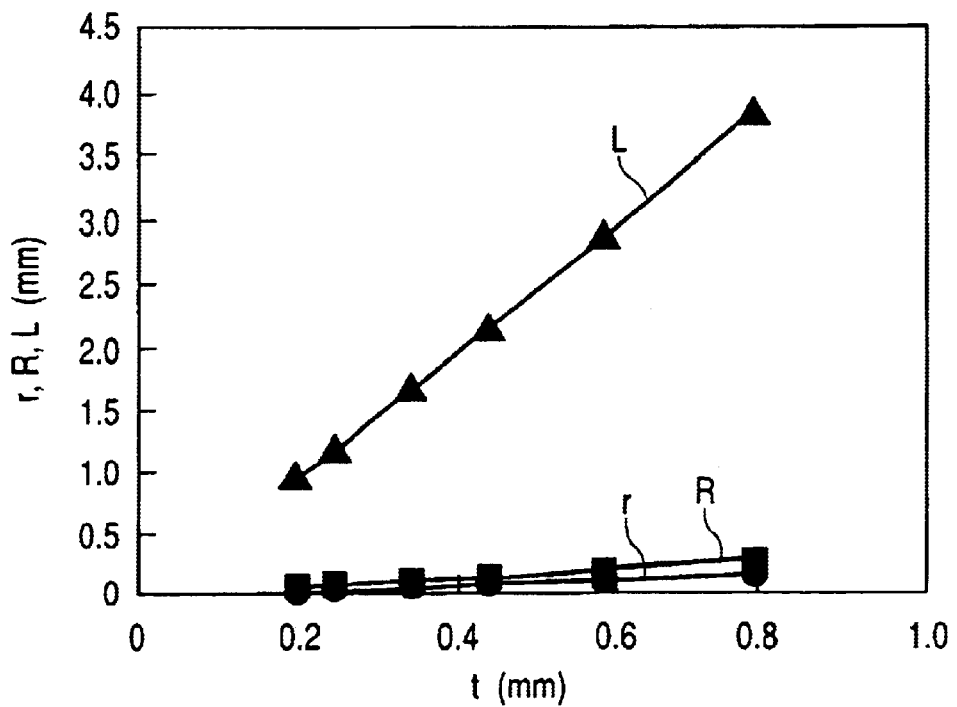
FIG. 4 is a graph showing the relations of lens thickness t to lens aperture radius r, convex face curvature radius R and operating length L in the 2-sheet lamination configuration.

FIG. 2A shows optical paths in the case where the number of lens rows is 5. FIGS. 3 and 4 show an example of the simulation result (in the case where the radiation angle θ of the light source is 14°, the number of lens rows is 7 and the refractive index n is 1.55). FIG. 3 shows the relation of MTF to lens thickness t. FIG. 4 shows the relations of lens aperture radius r, convex face curvature radius R and operating length L to lens thickness t. In FIG. 4, slopes of lines indicate the size ratios (r/t, R/t and L/t).

EXAMPLE 2

With respect to a lens array laminate having a structure in which three lens array sheets each having a large number of convex-convex spherical lens elements arrayed were closely laminated on one another, shape sizes to achieve resolutions of 300, 600 and 1200 dpi respectively by changing the refractive index, the numerical aperture (NA) and the number of lens rows were obtained by optical design simulation. It was a matter of course that the lens size needed to be reduced as the resolution increased. Allowable size ranges in which MTF in an erecting unit magnification lens system was kept 40% were calculated.

Conditions for simulation are as follows. Basically, these conditions are the same as those in Example 1.
(a) The lens array laminate is an optical system which is configured so that three lens array sheets each having 3 to 9 lens rows are closely laminated on one another. The respective lens elements are arrayed so as to be adjacent to one another.
(b) The aperture of the lens array is substantially shaped like a circle to be equal in dimension both in a main scanning direction and in a subsidiary scanning direction, in order to achieve brightness.
(c) The simulation is performed on the basis of light rays effective in forming an image on the assumption that stray light can be cut off.
(d) Values of parameters are set as follows.
   Wavelength of the light source: λ=700 nm
   Radiation angle of the light source: θ=16° to 12°
   Refractive index of the lens material: n=1.55 to 1.45
   The number of lens rows: 9 to 3 rows
(e) Lens radius r, lens thickness t, lens curvature radius R and operating length L are regarded as variables.

The procedure of the simulation is the same as that in Example 1.

Results of the simulation are shown in Tables 5 to 8. Table 5 shows values of lens thickness t to make MTF 40% in accordance with each resolution in the conditions that the refractive index n is changed to 1.55, 1.5 and 1.45 and the number of lens rows is changed to 5 and 3 respectively when the radiation angle θ of the light source is in a range of from 16° to 12°. Table 6 collectively shows the minimum and maximum values of the lens thickness t. It is obvious from Table 6 that the lens thickness t is preferably selected to be not larger than 8.0 mm. The lens thickness t is preferably selected to be not larger than 4.0 mm or more preferably not larger than 1.9 mm as resolution is made high.

TABLE 5

| | 300 dpi | | 600 dpi | | 1200 dpi | |
|---|---|---|---|---|---|---|
| n | 5 rows | 3 rows | 5 rows | 3 rows | 5 rows | 3 rows |
| | | | 16° | | | |
| 1.55 | 2.6 | 4.0 | 1.2 | 2.0 | 0.7 | 1.0 |
| 1.5 | 2.5 | 4.0 | 1.2 | 2.0 | 0.6 | 1.0 |
| 1.45 | 2.3 | 3.7 | 1.2 | 1.8 | 0.5 | 0.7 |
| | | | 14° | | | |
| 1.55 | 3.5 | 5.7 | 2.0 | 2.7 | 1.0 | 1.3 |
| 1.5 | 3.5 | 5.7 | 1.9 | 2.6 | 1.0 | 1.3 |
| 1.45 | 3.3 | 5.2 | 1.7 | 2.6 | 0.7 | 1.1 |
| | | | 12° | | | |
| 1.55 | 6.0 | 7.0 | 3.2 | 3.3 | 1.5 | 1.9 |
| 1.5 | 5.5 | 8.0 | 2.9 | 4.0 | 1.4 | 1.9 |
| 1.45 | 5.3 | 8.0 | 2.7 | 4.0 | 1.3 | 1.9 |

TABLE 6

12 to 16°, 3 to 9 rows

| 300 dpi – t (mm) | | 600 dpi – t (mm) | | 1200 dpi – t (mm) | |
|---|---|---|---|---|---|
| Minimum | Maximum | Minimum | Maximum | Minimum | Maximum |
| 2.3 | 8.0 | 1.2 | 4.0 | 0.5 | 1.9 |

Table 7 collectively shows size ratios (r/t, R/t and L/t) in the conditions that the refractive index n is changed to 1.55, 1.5 and 1.45 and the number of lens rows is changed to 9, 5 and 3 respectively when the radiation angle θ of the light source is in a range of from 16° to 12°. Table 8 collectively shows the minimum and maximum values of the size ratios. It is obvious from Table 8 that the ratio of lens aperture radius r to lens thickness t is preferably selected to be in a range of from 0.14 to 0.22, the ratio of convex face curvature radius R to lens thickness t is preferably selected to be in a range of from 0.42 to 0.65 and the ratio of operating length L to lens thickness t is preferably selected to be in a range of from 1.49 to 5.59.

TABLE 7

| | r/t | | | R/t | | | L/t | | |
|---|---|---|---|---|---|---|---|---|---|
| n | 9 rows | 5 rows | 3 rows | 9 rows | 5 rows | 3 rows | 9 rows | 5 rows | 3 rows |
| | | | | 16° | | | | | |
| 1.55 | 0.2 | 0.2121 | 0.2126 | 0.6408 | 0.5877 | 0.4936 | 5.5876 | 3.1252 | 1.4997 |
| 1.5 | 0.2 | 0.2123 | 0.2124 | 0.6019 | 0.5513 | 0.4587 | 5.5865 | 3.1252 | 1.4999 |
| 1.45 | 0.2 | 0.2121 | 0.2125 | 0.562 | 0.5125 | 0.4261 | 5.5864 | 3.1247 | 1.4996 |
| | | | | 14° | | | | | |
| 1.55 | 0.17 | 0.1889 | 0.1889 | 0.6301 | 0.5834 | 0.4901 | 5.4 | 3.156 | 1.5112 |
| 1.5 | 0.17 | 0.1888 | 0.1891 | 0.502 | 0.5457 | 0.4573 | 5.388 | 3.1553 | 1.5118 |
| 1.45 | 0.17 | 0.1886 | 0.189 | 0.549 | 0.5057 | 0.4245 | 5.41 | 3.1555 | 1.511 |
| | | | | 12° | | | | | |
| 1.55 | 0.1477 | 0.1618 | 0.1699 | 0.628 | 0.5782 | 0.4968 | 5.4616 | 3.1479 | 1.5993 |
| 1.5 | 0.1477 | 0.161 | 0.17 | 0.5921 | 0.5381 | 0.46 | 5.4594 | 3.1475 | 1.6 |
| 1.45 | 0.1477 | 0.1613 | 0.1699 | 0.5486 | 0.5019 | 0.4259 | 5.4599 | 3.1475 | 1.6 |

TABLE 8

12 to 16°, 3 to 9 rows

| r/t | | R/t | | L/t | |
|---|---|---|---|---|---|
| Minimum | Maximum | Minimum | Maximum | Minimum | Maximum |
| 0.148 | 0.213 | 0.425 | 0.641 | 1.499 | 5.588 |
| 0.14 | 0.22 | 0.42 | 0.65 | 1.49 | 5.59 |

Figure 2B:
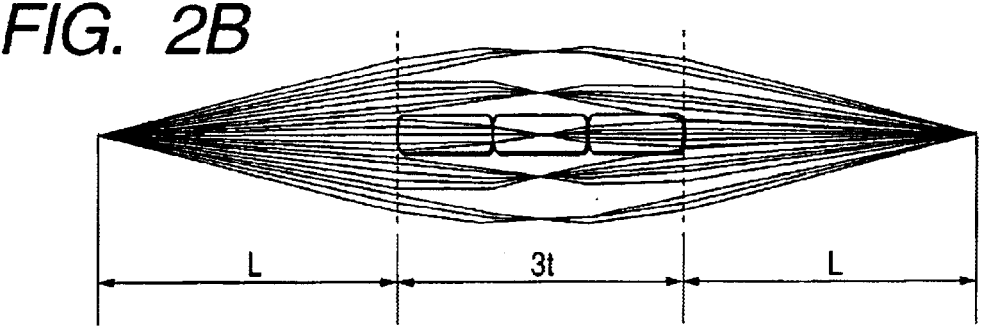
Figure 5:
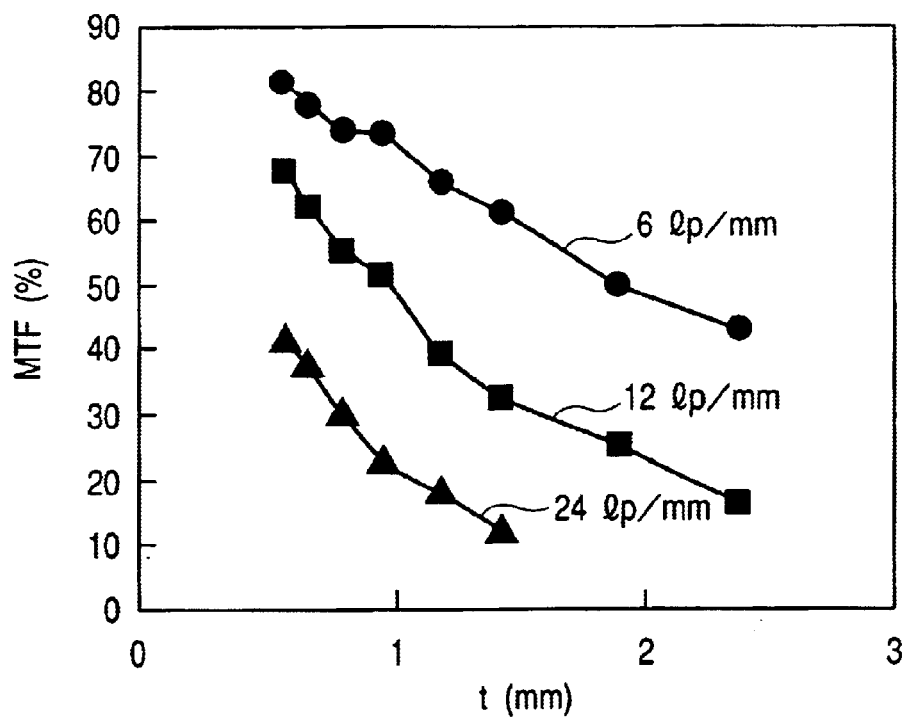
FIG. 5 is a graph showing the relation of lens thickness t to MTF in a 3-sheet lamination configuration.
Figure 6:
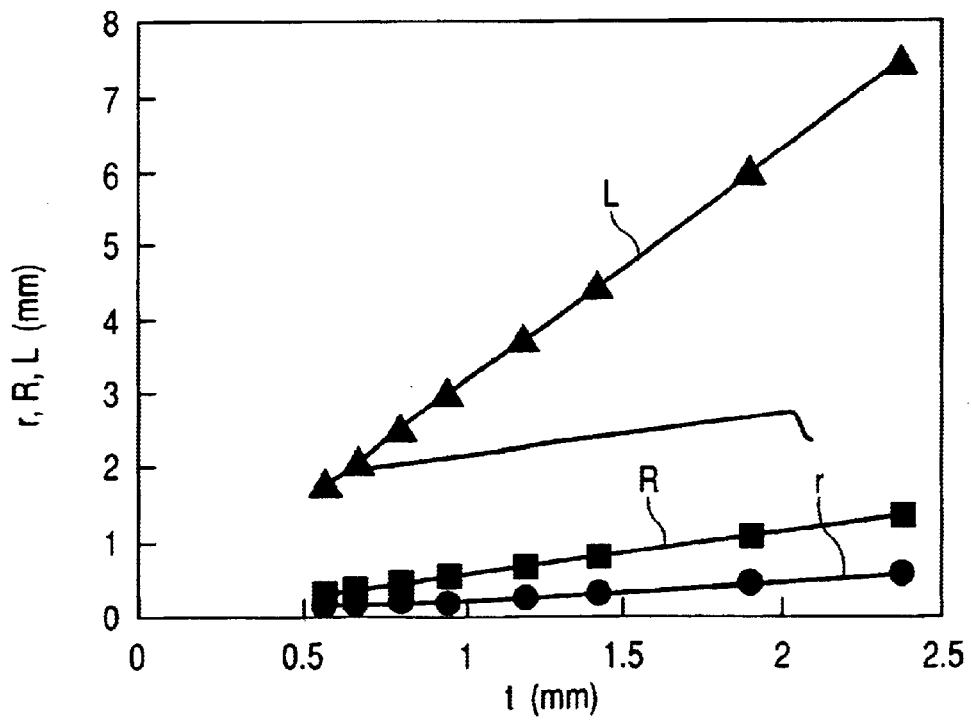
FIG. 6 is a graph showing the relations of lens thickness t to lens aperture radius r, convex face curvature radius R and operating length L in the 3-sheet lamination configuration.

FIG. 2B shows optical paths in the case where the number of lens rows is 5. FIGS. 5 and 6 show an example of the simulation result (in the case where the radiation angle θ of the light source is 16°, the number of lens rows is 5 and the refractive index n is 1.55). FIG. 5 shows the relation of MTF to lens thickness t. FIG. 6 shows the relations of lens aperture radius r, convex face curvature radius R and operating length L to lens thickness t.

EXAMPLE 3

With respect to a lens array laminate having a structure in which four lens array sheets each having a large number of convex-convex spherical lens elements arrayed were closely laminated on one another, shape sizes to achieve resolutions of 300, 600 and 1200 dpi respectively by changing the refractive index, the numerical aperture (NA) and the number of lens rows were obtained by optical design simulation. It was a matter of course that the lens size needed to be reduced as the resolution increased. Allowable size ranges in which MTF in an erecting unit magnification lens system was kept 40% were calculated.

Conditions for simulation are as follows. Basically, these conditions are the same as those in Example 1.

(a) The lens array laminate is an optical system which is configured so that four lens array sheets each having 3 to 9 lens rows are closely laminated on one another. The respective lens elements are arrayed so as to be adjacent to one another.
(b) The aperture of the lens array is substantially shaped like a circle to be equal in dimension both in a main scanning direction and in a subsidiary scanning direction, in order to achieve brightness.
(c) The simulation is performed on the basis of light rays effective in forming an image on the assumption that stray light can be cut off.
(d) Values of parameters are set as follows.
  Wavelength of the light source: λ=750 nm
  Radiation angle of the light source: θ=18° to 12°
  Refractive index of the lens material: n=1.55 to 1.45
  The number of lens rows: 9 to 3 rows
(e) Lens radius r, lens thickness t, lens curvature radius R and operating length L are regarded as variables.

The procedure of the simulation is the same as that in Example 1.

Results of the simulation are shown in Tables 9 to 12. Table 9 shows values of lens thickness t to make MTF 40% in accordance with each resolution in the conditions that the refractive index n is changed to 1.55, 1.5 and 1.45 and the number of lens rows is changed to 9, 5 and 3 respectively when the radiation angle θ of the light source is in a range of from 18° to 12°. Table 10 collectively shows the minimum and maximum values of the lens thickness t. It is obvious from Table 10 that the lens thickness t is preferably selected to be not larger than 8.0 mm. The lens thickness t is preferably selected to be not larger than 4.5 mm or more preferably not larger than 2.5 mm as resolution is made high.

TABLE 9

| | 300 dpi | | | 600 dpi | | | 1200 dpi | | |
|---|---|---|---|---|---|---|---|---|---|
| N | 9 rows | 5 rows | 3 rows | 9 rows | 5 rows | 3 rows | 9 rows | 5 rows | 3 rows |
| | | | | 18° | | | | | |
| 1.55 | 1.3 | 2.5 | 2.6 | 0.7 | 1.2 | 1.4 | 0.3 | 0.6 | 0.7 |
| 1.5 | 1.3 | 2.4 | 2.5 | 0.7 | 1.2 | 1.3 | 0.4 | 0.6 | 0.7 |
| 1.45 | 1.3 | 2.2 | 2.4 | 0.7 | 1.1 | 1.2 | 0.4 | 0.6 | 0.7 |
| 1.55 | 1.8 | 3.3 | 3.8 | 1.0 | 1.7 | 2.0 | 0.5 | 0.8 | 1.1 |
| 1.5 | 1.9 | 3.3 | 3.8 | 1.1 | 1.6 | 1.9 | 0.5 | 0.8 | 1.1 |
| 1.45 | 2.0 | 3.3 | 3.4 | 1.1 | 1.6 | 1.8 | 0.4 | 0.8 | 1.0 |
| | | | | 14° | | | | | |
| 1.55 | 2.8 | 4.2 | 6.0 | 1.5 | 2.4 | 3.1 | 0.7 | 1.2 | 1.6 |
| 1.5 | 2.8 | 4.2 | 6.0 | 1.6 | 2.4 | 3.0 | 0.7 | 1.2 | 1.6 |
| 1.45 | 2.8 | 4.2 | 6.0 | 1.6 | 2.8 | 2.2 | 0.7 | 1.2 | 1.5 |
| | | | | 12° | | | | | |
| 1.55 | 4.4 | 6.2 | 8.0 | 2.6 | 3.8 | 4.5 | 1.1 | 2.0 | 2.5 |
| 1.5 | 4.8 | 6.4 | 8.0 | 2.4 | 4.0 | 4.4 | 0.8 | 1.8 | 2.2 |
| 1.45 | 4.8 | 6.4 | 8.0 | 2.4 | 4.0 | 4.2 | 0.9 | 1.8 | 2.2 |

TABLE 10

| | 12 to 18°, 3 to 9 rows | | | | |
|---|---|---|---|---|---|
| 300 dpi – t (mm) | | 600 dpi – t (mm) | | 1200 dpi – t (mm) | |
| Minimum | Maximum | Minimum | Maximum | Minimum | Maximum |
| 1.3 | 8.0 | 0.7 | 4.5 | 0.3 | 2.5 |

Table 11 collectively shows size ratios (r/t, R/t and L/t) in the conditions that the refractive index n is changed to 1.55, 1.5 and 1.45 and the number of lens rows is changed to 9, 5 and 3 respectively when the radiation angle θ of the light source is in a range of from 18° to 12°. Table 12 collectively shows the minimum and maximum values of the size ratios. It is obvious from Table 12 that the ratio of lens aperture radius r to lens thickness t is preferably selected to be in a range of from 0.18 to 0.29, the ratio of convex face curvature radius R to lens thickness t is preferably selected to be in a range of from 0.75 to 1.10 and the ratio of operating length L to lens thickness t is preferably selected to be in a range of from 2.37 to 7.21.

TABLE 11

| | r/t | | | R/t | | | L/t | | |
|---|---|---|---|---|---|---|---|---|---|
| n | 9 rows | 5 rows | 3 rows | 9 rows | 5 rows | 3 rows | 9 rows | 5 rows | 3 rows |
| | | | | 18° | | | | | |
| 1.55 | 0.281 | 0.279 | 0.281 | 1.091 | 0.966 | 0.902 | 7.198 | 3.973 | 2.400 |
| 1.5 | 0.281 | 0.281 | 0.281 | 1.023 | 0.940 | 0.845 | 7.200 | 4.000 | 2.400 |
| 1.45 | 0.281 | 0.281 | 0.281 | 0.950 | 0.872 | 0.782 | 7.199 | 4.000 | 2.378 |
| | | | | 16° | | | | | |
| 1.55 | 0.250 | 0.250 | 0.250 | 1.004 | 0.996 | 0.892 | 7.204 | 4.000 | 2.400 |
| 1.5 | 0.250 | 0.250 | 0.250 | 1.018 | 0.932 | 0.831 | 7.202 | 4.000 | 2.400 |
| 1.45 | 0.250 | 0.250 | 0.250 | 0.946 | 0.864 | 0.770 | 7.202 | 4.000 | 2.400 |
| | | | | 14° | | | | | |
| 1.55 | 0.220 | 0.221 | 0.220 | 1.078 | 0.990 | 0.886 | 7.200 | 4.012 | 2.400 |
| 1.5 | 0.220 | 0.220 | 0.220 | 1.010 | 0.924 | 0.824 | 7.201 | 4.004 | 2.400 |
| 1.45 | 0.220 | 0.220 | 0.220 | 0.937 | 0.856 | 0.762 | 7.201 | 4.004 | 2.400 |
| | | | | 12° | | | | | |
| 1.55 | 0.189 | 0.189 | 0.189 | 1.072 | 0.980 | 0.877 | 7.200 | 3.999 | 2.400 |
| 1.5 | 0.189 | 0.189 | 0.189 | 1.006 | 0.917 | 0.820 | 7.201 | 3.999 | 2.400 |
| 1.45 | 0.189 | 0.189 | 0.189 | 0.933 | 0.849 | 0.756 | 7.200 | 3.999 | 2.400 |

TABLE 12

| 12 to 18°, 3 to 9 rows | | | | | |
|---|---|---|---|---|---|
| r/t | | R/t | | L/t | |
| Minimum | Maximum | Minimum | Maximum | Minimum | Maximum |
| 0.189 | 0.281 | 0.756 | 1.091 | 2.378 | 7.204 |
| 0.18 | 0.29 | 0.75 | 1.10 | 2.37 | 7.21 |

Figure 2C:
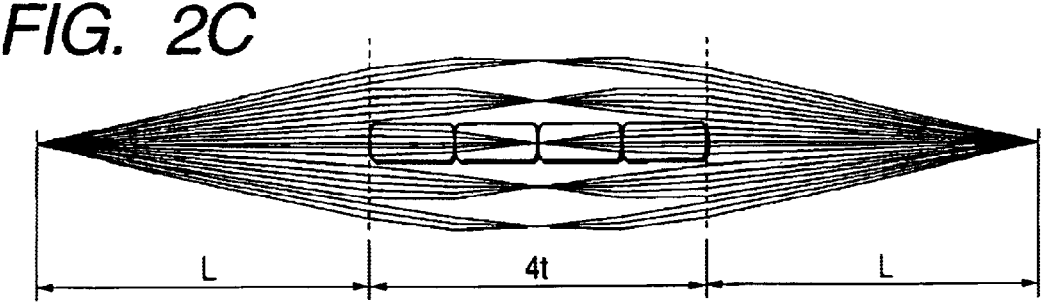
Figure 7:
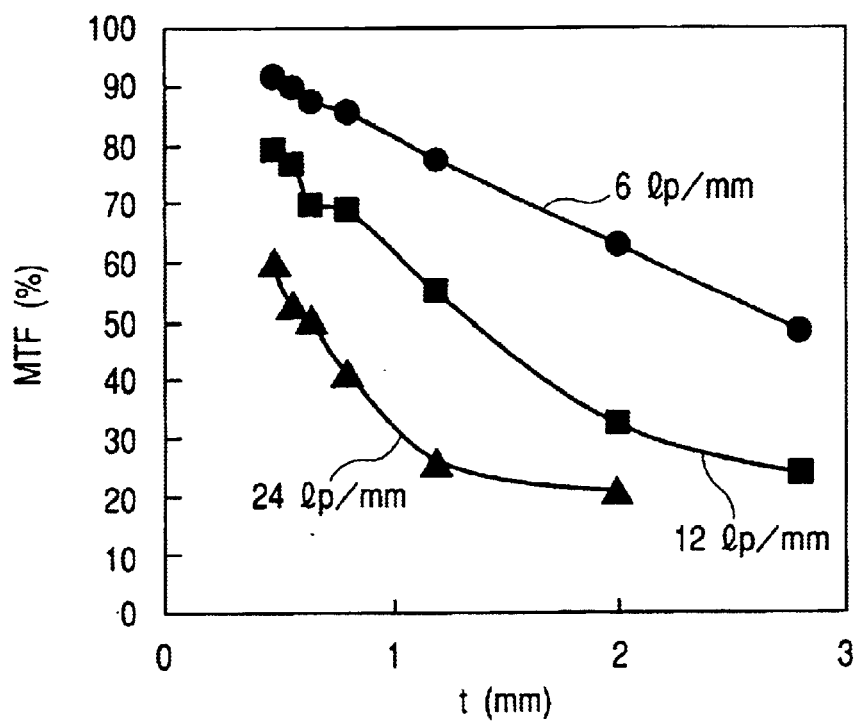
FIG. 7 is a graph showing the relation of lens thickness t to MTF in a 4-sheet lamination configuration.
Figure 8:
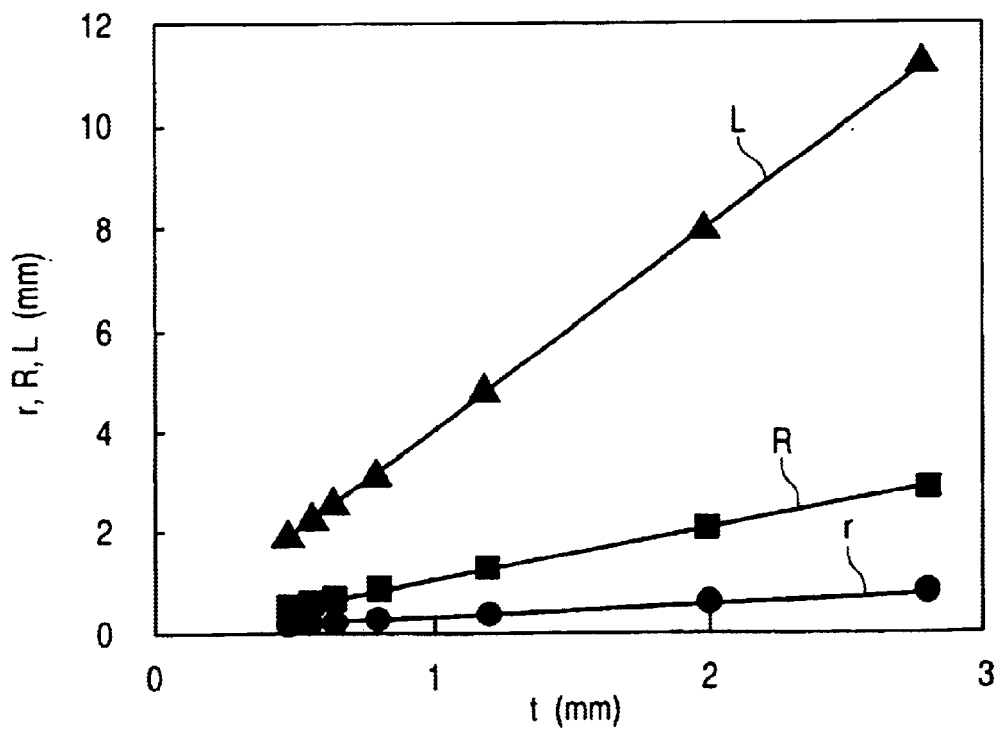
FIG. 8 is a graph showing the relations of lens thickness t to lens aperture radius r, convex face curvature radius R and operating length L in the 4-sheet lamination configuration.

FIG. 2C shows optical paths in the case where the number of lens rows is 5. FIGS. 7 and 8 show an example of the simulation result (in the case where the radiation angle θ of the light source is 16°, the number of lens rows is 5 and the refractive index n is 1.55). FIG. 7 shows the relation of MTF to lens thickness t. FIG. 8 shows the relations of lens aperture radius r, convex face curvature radius R and operating length L to lens thickness t.

As described above, in accordance with the first embodiment of the invention, a plurality of lens array sheets each having convex-convex lens elements arranged in a plurality of rows are substantially closely laminated on one another. Hence, the number of lens array sheets can be reduced as extremely as possible while the lens array sheets can be butt-positioned. As a result, easy assembling and reduction in cost can be achieved.

Particularly when the lens array laminate is constituted by two to four lens array sheets, the number of parts can be reduced extremely. Further, when lens array sheets each having 3 to 9 lens rows are used, brightness, high resolution and reduction in size can be achieved because the lens array laminate is designed so that the aperture of the lens array is circularly shaped as well as the number of lens rows is large.

Second Embodiment

Figure 9:
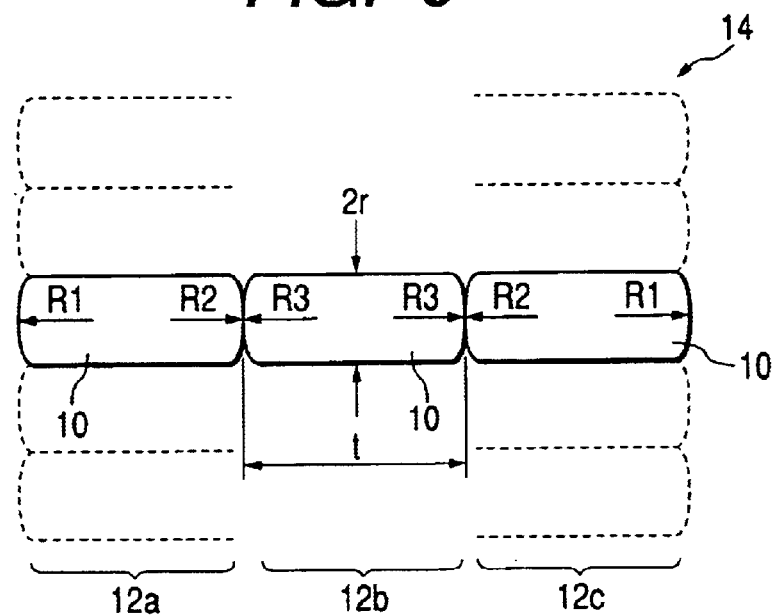
FIG. 9 is an explanatory view showing a second embodiment of an image transfer device according to the invention.
Figure 10:
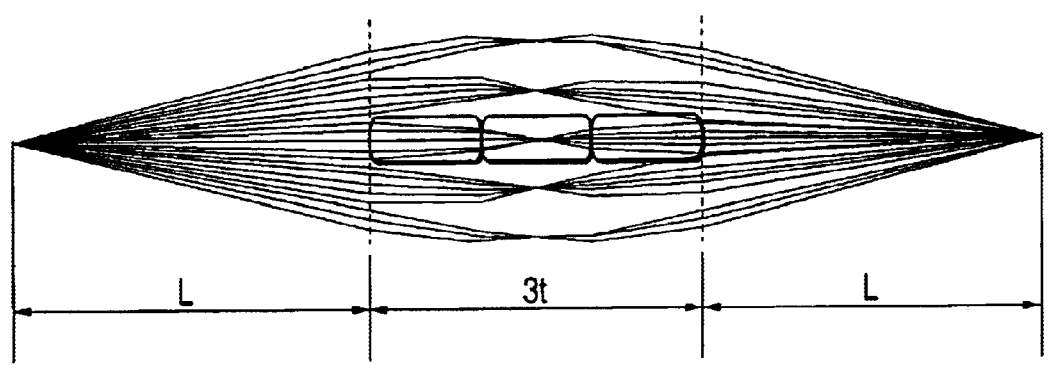
FIG. 10 is an explanatory view showing optical paths in the second embodiment.

As shown in FIG. 9, the image transfer device according to a second embodiment of the invention has a lens array laminate 14 forming an erecting unit magnification optical system, the lens array laminate 14 including three lens array sheets 12a, 12b and 12c each of which has convex-convex lens elements 10 arranged in 3 to 9 rows and which are laminated so that lens optical axes of corresponding lens elements 10 coincide with one another. Each of the lens array sheets 12a, 12b and 12c is made of a transparent material having a refractive index of not lower than 1.45 and is provided as a plate-like body in which the lens elements 10 are arranged two-dimensionally so that 3 to 9 rows of lens elements 10 are arranged in a widthwise direction (i.e. in an upper-and-lower direction of the paper plane of FIG. 9) while a large number of lens elements 10 are arranged in a lengthwise direction (i.e. in a perpendicular direction to the paper plane of FIG. 9). The lens elements 10 may be arranged so as to be shaped like a square or may be arranged densely. Each of the lens array sheets can be produced easily by integral molding by use of a transparent resin.

In the second embodiment of the invention, the two lens array sheets 12a and 12c located outward are equal in structure to each other and arranged so as to be symmetric to each other with respect to the center of lamination whereas the intermediate lens array sheet 12b is different in structure from the two lens array sheets 12a and 12c. Hence, the curvature radii of lens faces located on opposite sides and symmetric to each other with respect to the center of lamination are set to be equal to each other. The curvature radii are set to satisfy the relations R1<R3<R2 in which R1 is the curvature radius of outer lens faces in the outer lens array sheets 12a and 12c, R2 is the curvature radius of inner lens faces in the outer lens array sheets 12a and 12c, and R3 is the curvature radius of opposite lens faces in the intermediate lens array sheet 12b.

Theoretical resolution is improved as the number of lens sheets (the number of lens array sheets to be laminated) increases. This is because when the number of lens sheets increases, light-condensing power per lens array sheet can be reduced and, accordingly, the curvature of each convex-convex lens element can be reduced and spherical aberration can be reduced. In practice, however, the number of lens faces increases as the number of lens array sheets to be laminated increases. Hence, the total quantity of transmitted light is reduced because the lens faces more or less reflect light. Moreover, it is difficult to enhance positional accuracy in lamination. Hence, resolution is apt to be lowered because of positional displacement, so that lowering of resolution causes increase in size. On the contrary, in the configuration in which the number of lens array sheets is reduced, that is, two lens array sheets are laminated, the effect of changing the curvature radii of lens faces is not remarkable. For these reasons, three lens array sheets are designed to be laminated in the invention.

The lens thickness of each lens array sheet is set to be not larger than 8.0 mm, preferably not larger than 4.0 mm, more preferably not larger than 2.0 mm for obtaining higher resolution. Although it is preferable that the lens thickness is small, it may be difficult to handle the lens array sheet if the lens thickness is too small (for example, smaller than 0.5 mm) because the mechanical strength of the lens array sheet itself is lowered. If the lens thickness is contrariwise too large, characteristic is not particularly improved any more and there is a problem in wasteful use of material, increase in thickness, and so on. It is also preferable that the ratio of the radius of the lens aperture to the lens thickness is set to be in a range of from about 0.14 to about 0.22 and the ratio of the curvature radius of the convex face to the lens thickness is set to be in a range of from about 0.42 to about 0.65.

In the configuration that the lens array sheets are closely coupled to one another, the lens array sheets can be butt-positioned, so that there is an advantage in that it is not necessary to provide any member for defining the distance between adjacent lens array sheets. Moreover, each lens array sheet can be made thick, so that strength after assembling can be also improved.

Further, in the invention, 3 to 9 rows of lens elements are arranged to thereby achieve an optical system which is small in size, bright and little in unevenness. Incidentally, if 2 or less rows of lens elements are arranged, unevenness in brightness in a main scanning direction becomes large. If the operating length is made long to reduce the unevenness in brightness, the aperture in a row direction becomes so small that the lens becomes dark undesirably. A lens array little in unevenness can be achieved by increasing the number of lens rows. However, if the number of lens rows is larger than 9, the size of the optical system becomes remarkably large undesirably. From these facts, it is preferable that the number of lens rows is set to be in a range of from 4 to 6. Particularly, a configuration of 5 lens rows is optimal.

EXAMPLES

On the assumption that R1, R2 and R3 were curvature radii of lens faces in a lens array laminate which was configured as shown in FIG. 9 so that three lens array sheets each having a large number of convex-convex lens elements shaped like spheres and arranged in rows were closely laminated, the ranges of the curvature radii to improve resolution MTF (Modulation Transfer Function) compared with the case of R=R1=R2=R3 (Comparative Example) were obtained by optical design simulation.

EXAMPLE 4

Conditions for simulation are as follows.

(a) First, a lens array sheet having 5 lens rows is designed under the following conditions in addition to the condition that the curvature radii of the respective lens faces satisfy the relations R=R1=R2=R3.

Numerical aperture NA=0.275 (equivalent to an angular aperture of 16°)

Lens face curvature radius R=0.458 mm

Lens radius r=0.17 mm

Lens array sheet thickness t=0.8 mm

Operating length L=2.5 mm

The respective lens elements are arranged so as to be adjacent to one another. Any arrangement method such as hexagonal symmetry or tetragonal symmetry may be used. Alternatively, dense arrangement may be used.

(b) The aperture of the lens array is substantially shaped like a circle to be equal in dimension both in a main scanning direction and in a subsidiary scanning direction, in order to achieve brightness.

(c) The simulation is performed on the basis of light rays effective in forming an image on the assumption that stray light can be cut off. In practice, a unit such as a light-shielding film provided between adjacent lens elements in a surface of each lens array sheet or a partition wall provided on the outside of each lens array sheet is provided for cutting off stray light.

(d) Values of parameters are set as follows.

Wavelength of the light source: λ=700 nm

Refractive index of the lens material: n=1.5

The procedure of the simulation is as follows.

(1) The curvature radius R2 of the inner lens faces in the outer lens array sheets 12a and 12c to maximize MTF is obtained while the curvature radius R1 of the outer lens faces in the outer lens array sheets 12a and 12c is changed in a range of R1<R3 in the condition that the curvature radius R3 of the opposite lens faces in the intermediate lens array sheet 12b is fixed (R3=0.458 mm).

(2) The range of R2/R1 to optimize MTF is determined.

Figure 11:
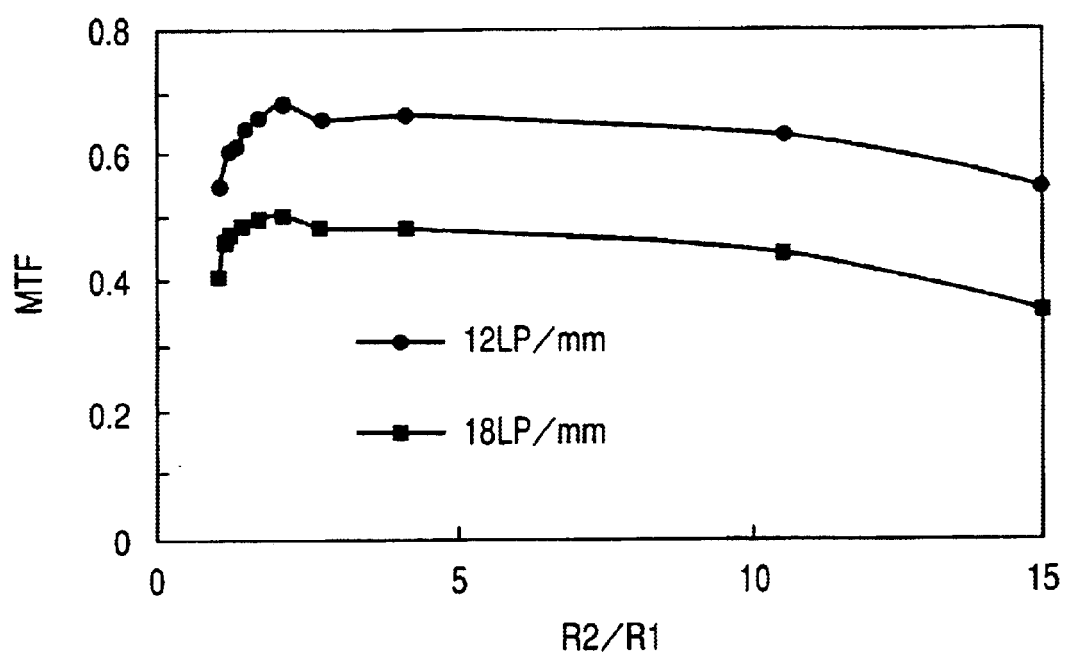
FIG. 11 is a graph showing the relation between R2/R1 and MTF in Example 4.

Table 13 shows the relations of R1/R3, R2/R3 and R2/R1 to various values of R1 and R2, and the relation of MTF to various values of R1 and R2 in input images with spatial frequencies 12LP/mm and 18LP/mm. In Table 13, a combination shown in the first line shows Comparative Example in which the curvature radii of all the lens faces are equal to one another. In Table 13, the combination to maximize MTF is a combination (R=0.410 mm, R2=0.848 mm) shown in the sixth line. FIG. 11 shows the relation between R2/R1 and MTF in accordance with the spatial frequencies 12LP/mm and 18LP/mm.

TABLE 13

|  |  |  |  |  | MTF | |
| --- | --- | --- | --- | --- | --- | --- |
| R1 | R2 | R1/R3 | R2/R3 | R2/R1 | 12 LP/mm | 18 LP/mm |
| 0.458 | 0.458 | 1.000 | 1.000 | 1.000 | 0.548 | 0.409 |
| 0.450 | 0.500 | 0.983 | 1.092 | 1.111 | 0.602 | 0.456 |

TABLE 13-continued

|  |  |  |  |  | MTF | |
| --- | --- | --- | --- | --- | --- | --- |
| R1 | R2 | R1/R3 | R2/R3 | R2/R1 | 12 LP/mm | 18 LP/mm |
| 0.440 | 0.535 | 0.961 | 1.168 | 1.216 | 0.605 | 0.474 |
| 0.430 | 0.606 | 0.939 | 1.323 | 1.409 | 0.646 | 0.478 |
| 0.420 | 0.685 | 0.917 | 1.496 | 1.631 | 0.657 | 0.498 |
| 0.410 | 0.848 | 0.895 | 1.852 | 2.068 | 0.681 | 0.504 |
| 0.400 | 1.076 | 0.873 | 2.349 | 2.690 | 0.657 | 0.482 |
| 0.390 | 1.615 | 0.852 | 3.526 | 4.141 | 0.663 | 0.481 |
| 0.380 | 4.013 | 0.830 | 8.762 | 10.561 | 0.632 | 0.443 |
| 0.370 | 5.530 | 0.808 | 12.074 | 14.946 | 0.551 | 0.356 |

EXAMPLE 5

Conditions for simulation are as follows.

First, a lens array sheet having 5 lens rows is designed under the following conditions in addition to the condition that the curvature radii of the respective lens faces satisfy the relations R=R1=R2=R3.

Numerical aperture NA=0.342 (equivalent to an angular aperture of 20°)

Lens face curvature radius R=0.377 mm

Lens radius r=0.17 mm

Lens array sheet thickness t=0.643 mm

Operating length L=2.01 mm

Other conditions are the same as those in Example 4.

The procedure of the simulation is as follows.

(1) The curvature radius R2 of the inner lens faces in the outer lens array sheets 12a and 12c to maximize MTF is obtained while the curvature radius R1 of the outer lens faces in the outer lens array sheets 12a and 12c is changed in a range of R1<R3 in the condition that the curvature radius R3 of the opposite lens faces in the intermediate lens array sheet 12b is fixed (R3=0.377 mm).

(2) The range of R2/R1 to optimize MTF is determined.

Figure 12:
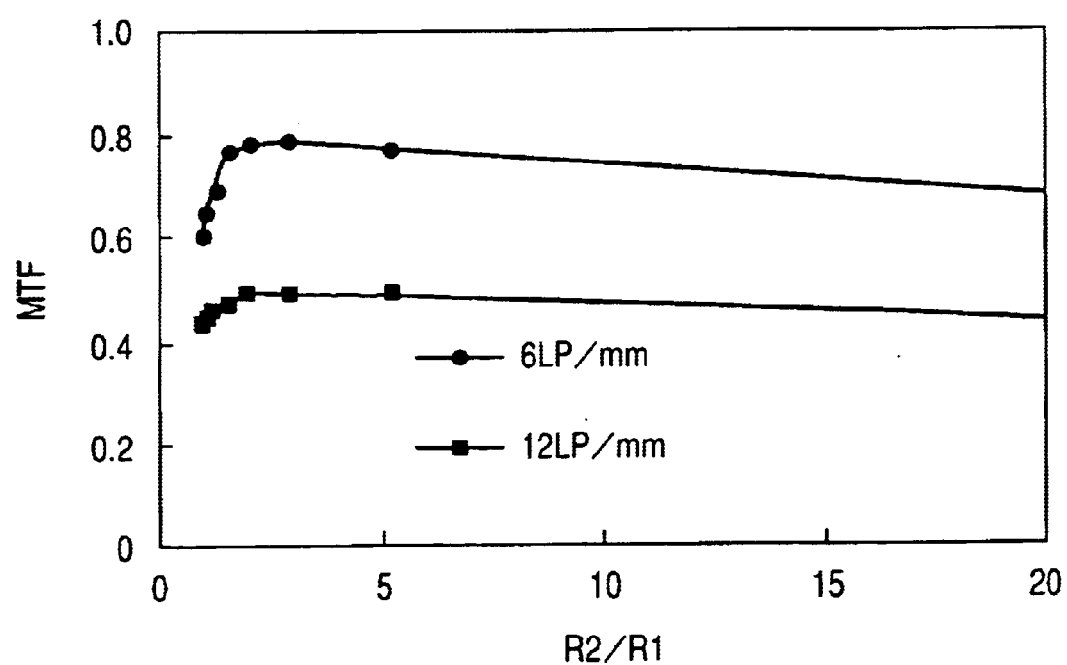
FIG. 12 is a graph showing the relation between R2/R1 and MTF in Example 5.

Table 14 shows the relations of R1/R3, R2/R3 and R2/R1 to various values of R1 and R2, and the relation of MTF to various values of R1 and R2 in input images with spatial frequencies 6LP/mm and 12LP/mm. In Table 14, a combination shown in the first line shows Comparative Example in which the curvature radii of all the lens faces are equal to one another. In Table 14, the combination to maximize MTF is a combination (R1=0.330 mm, R2=0.959 mm) shown in the sixth line. FIG. 12 shows the relation between R2/R1 and MTF in accordance with the spatial frequencies 6LP/mm and 12LP/mm.

TABLE 14

|  |  |  |  |  | MTF | |
| --- | --- | --- | --- | --- | --- | --- |
| R1 | R2 | R1/R3 | R2/R3 | R2/R1 | 6 LP/mm | 12 LP/mm |
| 0.377 | 0.377 | 1.000 | 1.000 | 1.000 | 0.601 | 0.432 |
| 0.370 | 0.408 | 0.981 | 1.082 | 1.103 | 0.651 | 0.445 |
| 0.360 | 0.462 | 0.955 | 1.225 | 1.283 | 0.693 | 0.458 |
| 0.350 | 0.561 | 0.928 | 1.488 | 1.603 | 0.766 | 0.472 |
| 0.340 | 0.688 | 0.902 | 1.825 | 2.024 | 0.778 | 0.492 |
| 0.330 | 0.959 | 0.875 | 2.544 | 2.906 | 0.784 | 0.493 |
| 0.320 | 1.660 | 0.849 | 4.403 | 5.188 | 0.774 | 0.491 |
| 0.300 | 7.273 | 0.796 | 19.292 | 24.243 | 0.661 | 0.427 |

It is obvious from these results that MTF is improved when the ratio R2/R1 of the curvature radius R2 to the curvature radius R1 in the lens faces of the outer lens array sheets is set to be larger than 1. High MTF values can be obtained when the ratio R2/R1 is in a range of 1.1<R2/R1≦10, particularly in a range of 1.3≦R2/R1<5.

Table 15 shows an MTF improving effect. To what degree resolution MTF in the best Example is improved compared with Comparative Example is collectively shown in Table 15. It is obvious that the MTF improving effect is numerically in a range of from ten and several % to about 30%.

TABLE 15

| Lens Array | R2/R1 | MTF | | |
| --- | --- | --- | --- | --- |
| | | 6 LP/mm | 12 LP/mm | 18 LP/mm |
| Example A | 1→2.07 | | 0.55→0.68 | 0.41→0.50 |
| Example B | 1→2.91 | 0.60→0.78 | 0.43→0.49 | |

As described above, in accordance with the second embodiment of the invention, three lens array sheets each having convex-convex lens elements arranged in a plurality of rows are laminated on one another. Hence, the number of lens array sheets can be reduced as extremely as possible. As a result, easy assembling and reduction in cost and size can be achieved. Moreover, power balance between the lens elements can be optimized. Hence, brightness and high resolution can be achieved.

Third Embodiment

Figure 13A:
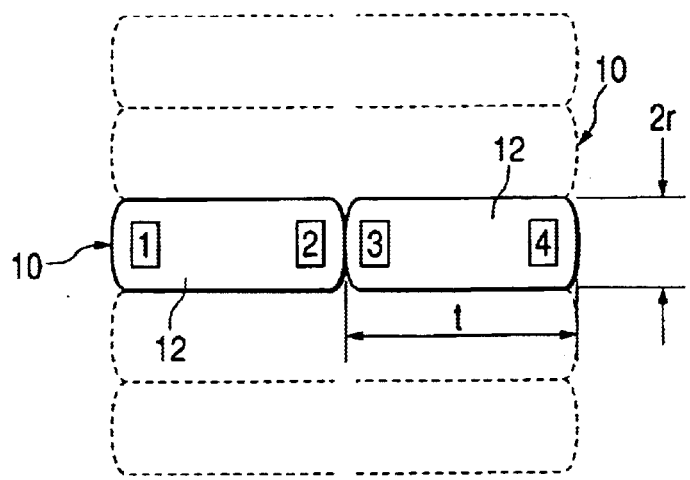
FIGS. 13A and 13B are explanatory views showing a third embodiment of an image transfer device according to the invention.
Figure 13B:
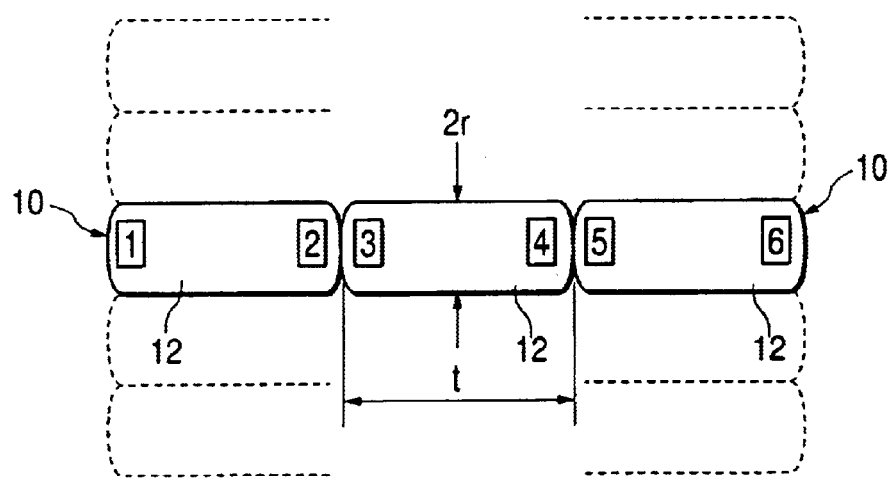

The image transfer device according to a third embodiment of the invention is configured so that two lens array sheets 10 are laminated as shown in FIG. 13A or three lens array sheets 10 are laminated as shown in FIG. 13B. That is, in each of FIGS. 13A and 13B, the image transfer device has a lens array laminate forming an erecting unit magnification optical system, the lens array laminate including lens array sheets 10 each of which has from three to nine rows of convex-convex lens elements 12 and which are laminated so that lens optical axes of corresponding lens elements coincide with one another. Each of the lens array sheets 10 is made of a transparent material having a refractive index of not lower than 1.45. Each of the lens array sheets 10 is a plate-shaped body having the lens elements 12 which are arranged two-dimensionally so that three to five rows of lens elements 12 (e.g. five rows of lens elements 12 in each of FIGS. 13A and 13B) are arranged in a widthwise direction (i.e. in an upper-and-lower direction of the paper plane of each of FIGS. 13A and 13B) whereas a large number of lens elements 12 are arranged in a lengthwise direction (i.e. in a perpendicular direction to the paper plane of each of FIGS. 13A and 13B). The respective lens elements 12 may be arranged so as to be shaped like a square or may be arranged densely. Each of the lens array sheets can be produced easily by integral molding by use of a transparent resin.

When the lens array laminate is constituted by two lens array sheets, the two lens array sheets are the same in structure and are disposed so as to be symmetric with respect to the center of lamination. When the lens array laminate is constituted by three lens array sheets, one intermediate lens array sheet is different in structure from two outer lens array sheets (but the same in structure of opposite lens faces as the two outer lens array sheets) whereas the two outer lens array sheets are the same in structure and are disposed so as to be symmetric with respect to the center of lamination. Assume now that the lens faces in FIGS. 13A and 13B are numbered in rightward order from a first face to a fourth face (in the case where the lens array laminate is constituted by two lens array sheets) and from a first face to a sixth face (in the case where the lens array laminate is constituted by three lens array sheets) respectively. Then, the first and fourth faces are the same in shape (but symmetrical) and the second and third faces are the same in shape (but symmetrical) when the lens array laminate is constituted by two lens array sheets, and the first and sixth faces are the same in shape (but symmetrical), the second and fifth faces are the same in shape (but symmetrical) and the third and fourth faces are the same in shape (but symmetrical) when the lens array laminate is constituted by three lens array sheets. In addition, in the third embodiment of the invention, at least two of the four or six lens faces are shaped aspherically.

Generally, an aspherical lens has a lens peripheral portion deviated from a sphere, so that a portion of the lens near the optical axis of the lens substantially coincides with the sphere. Light from an object is spread over an outer lens face so that the light enters the whole of the outer lens face. Hence, the lens shaped aspherically is effective in correcting aberration generated in the lens peripheral portion. This also contributes to improvement in resolution. On the other hand, light narrowed by the outer lens face enters an inner lens face. Hence, the range allowed to be used by the lens is limited to a range near the optical axis of the lens compared with the outer lens face. Accordingly, the effect of the asphere becomes most remarkable in the outer lens face. When the lens faces are to be partially shaped aspherically, it is therefore preferable that the two outermost lens faces are shaped aspherically.

Figure 14:
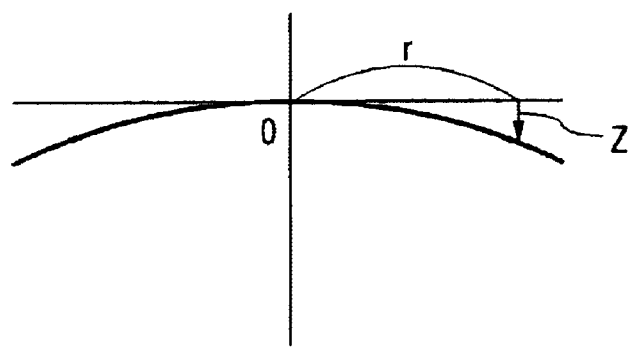
FIG. 14 is an explanatory view showing an a spherical shape.

Incidentally, an aspherical shape is generally given by the following expression. Z is a sag which is given by a function of a distance r from the center O of a lens face as shown in FIG. 14.

$$Z = CV.r^2/[1+\{1-CV^2(CC+1).r^2\}^{1/2}]+AD.r^4+AE.r^6+AF.r^8+AG.r^{10}$$

In this expression, CV is equal to 1/R and indicates center curvature. CC, AD, AE, AF and AG are aspherical coefficients. In detail, CC is an aspherical coefficient defining a quadratic curved face of revolution as a base, and AD, AE, AF and AG are aspherical coefficients indicating divergence from the quadratic curved face. The case where these aspherical coefficients are all zero is equivalent to a sphere.

Figure 15A:
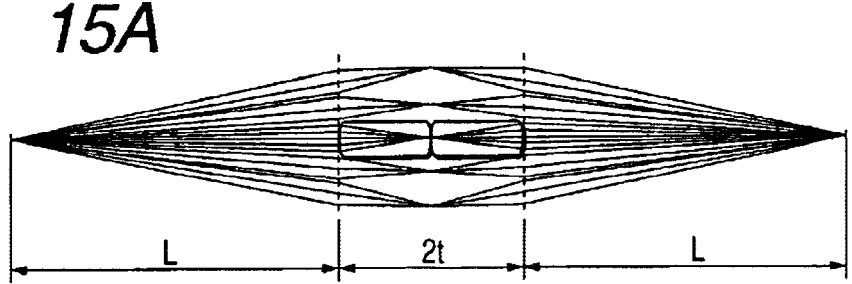
FIGS. 15A and 15B are explanatory views showing optical paths in the third embodiments of the image transfer device according to the invention.
Figure 15B:
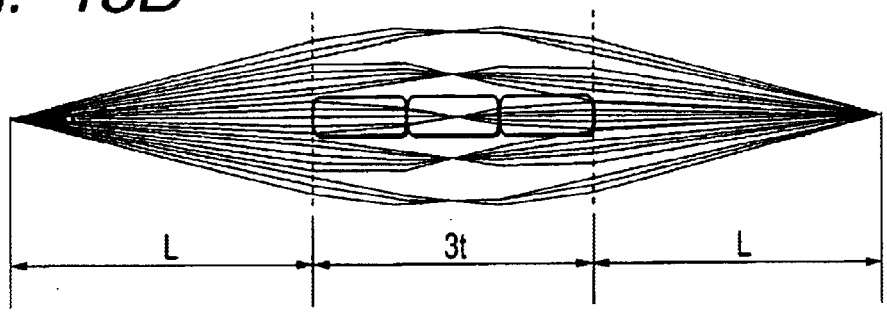

When lens array sheets 10 are closely coupled to each other or one another as shown in FIG. 13A or 13B in the case where the lens array sheets are to be laminated, the lens array sheets can be butt-positioned. Hence, there is an advantage in that it is unnecessary to provide any member for defining the distance between adjacent lens array sheets. Moreover, each of the lens array sheets can be made thick, so that strength after assembling is improved. FIG. 15A is a view showing optical paths in the case where the lens array laminate is constituted by two lens array sheets. FIG. 15B is a view showing optical paths in the case where the lens array laminate is constituted by three lens array sheets.

In the invention, 3 to 9 rows of lens elements are arranged to thereby achieve an optical system which is small in size, bright and little in unevenness. Incidentally, if 2 or less rows of lens elements are arranged, unevenness in brightness in a main scanning direction becomes large. If the operating length is made long to reduce the unevenness in brightness, the aperture in a row direction becomes so small that the lens becomes dark undesirably. A lens array little in unevenness can be achieved by increasing the number of lens rows. However, if the number of lens rows is larger than 9, the size of the optical system becomes remarkably large undesirably. From these facts, it is preferable that the number of lens rows is set to be in a range of from 3 to 5.

EXAMPLE 6

With respect to lens array laminates of various structures in which two or three lens array sheets each having a large number of convex-convex lens elements arranged were closely laminated, lens face shapes to improve resolution MTF (Modulation Transfer Function) were obtained by optical design simulation.

Hereinafter, to simplify description, the specification of a lens array laminate will be designated by a series of symbols "αsβrγ-X" in which α, β and γ are numerals indicating the number of lens array sheets, the number of lens rows and the angular aperture of the lens array laminate respectively, and X is an alphabet. X="A" indicates the case where only the outermost lens faces are aspherical. X="B" indicates the case where all the lens faces are aspherical. X="O" indicates the case where all the lens faces are spherical (Comparative Example) For example, in the case of the notation "3s5r16-A", this notation therefore indicates a lens array laminate which is constituted by three lens array sheets each having lens elements arranged in 5 rows and has an angular aperture of 16 degrees and in which only the outermost lens faces are aspherical.

Conditions for simulation are as follows.

(a) With respect to each of the lens array laminates configured as shown in Table 16, aspherical coefficients are determined so that MTF is maximized. The lens array sheets are assumed to be brought into close contact with each other.
(b) The simulation is performed on the basis of light rays effective in forming an image on the assumption that stray light can be cut off. Therefore, a sufficient light-shielding unit(such as a light-shielding film provided between adjacent lens elements in a surface of each lens array sheet or a partition wall provided on the outside of each lens array sheet) is provided to prevent any flare light and any ghost image.
(c) The basic dimensions (curvature radius R, lens array sheet thickness t, lens element radius r and operating length L) of each lens array sheet in each configuration are shown in Table 17. Incidentally, the sign of R is positive in odd-numbered faces but negative in even-numbered faces. Although the lens elements are assumed to be arranged so as to be adjacent to one another, any arrangement method such as hexagonal symmetry or tetragonal symmetry may be used. Alternatively, dense arrangement may be used.
(d) The aperture of the lens array is substantially shaped like a circle to be equal in dimension both in a main scanning direction and in a subsidiary scanning direction, in order to achieve brightness.
(e) Values of parameters are set as follows.

Wavelength of the light source: λ=700 nm

Refractive index of the lens material: n=1.53

TABLE 16

| Lens Configuration | Lens Face | | | | | |
|---|---|---|---|---|---|---|
| | Fist Face | Second Face | Third Face | Fourth Face | Fifth Face | Sixth Face |
| 2s3r14-O | | | | | — | — |
| 2s3r14-A | AS | | | AS-1 | — | — |
| 2s3r14-B | AS | AS | AS-2 | AS-1 | — | — |
| 3s3r16-O | | | | | | |
| 3s3r16-A | AS | | | | | AS-1 |
| 3s3r16-B | AS | AS | AS | AS-3 | AS-2 | AS-1 |
| 3s5r16-O | | | | | | |
| 3s5r16-B | AS | AS | AS | AS-3 | AS-2 | AS-1 |
| 3s5r18-O | | | | | | |
| 3s5r18-B | AS | AS | AS | AS-3 | AS-2 | AS-1 |
| 3s5r20-O | | | | | | |
| 3s5r20-B | AS | AS | AS | AS-3 | AS-2 | AS-1 |

Configuration Notation 3s3r16: 3 sheets, 3 rows, 16 degrees

O: All the faces were spherical.

A: Only the first and last faces were aspherical.

B: All the faces were aspherical.

AS: aspherical face

AS-2: aspherical face symmetric to the second face

TABLE 17

| Lens Configuration | R (mm) | t (mm) | r (mm) | L (mm) |
|---|---|---|---|---|
| 2s3r14-O | 0.215 | 0.800 | 0.150 | 1.600 |
| 3s3r16-O | 0.515 | 1.000 | 0.200 | 2.000 |
| 3s5r16-O | 0.457 | 0.800 | 0.170 | 2.500 |
| 3s5r18-O | 0.407 | 0.709 | 0.170 | 2.206 |
| 3s5r20-O | 0.382 | 0.643 | 0.170 | 2.000 |

Results of the simulation are as follows.

(1) Optimum aspherical coefficients in each lens configuration are shown in Table 18. Incidentally, the sign of the coefficient CC does not depend on the direction of the lens face but the value of each of the coefficients AD to AG shown in Table 18 is multiplied by −1 in even-numbered faces so that the sign of each of the coefficients AD to AG is inverted.

(2) Table 19 collectively shows results of ranges in which an MTF improving effect can be recognized.

Figure 16:
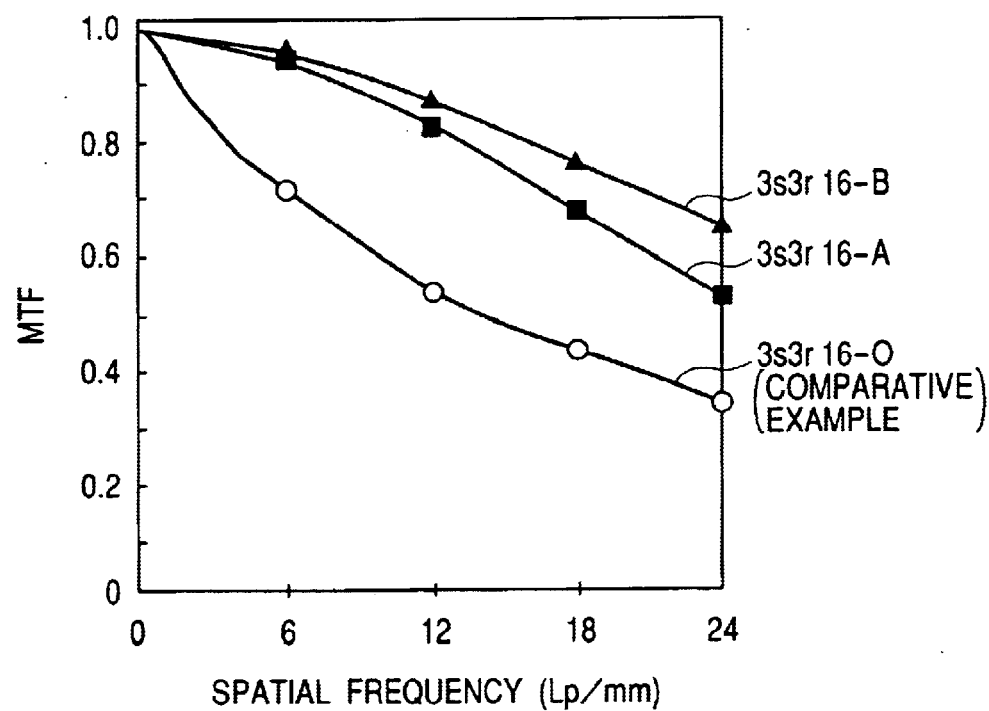
FIG. 16 is a graph showing an example of the relation between spatial frequency (Lp/mm) and MTF.

(3) FIG. 16 shows the case where the relation of MTF to input images different in spatial frequency (Lp/mm) is plotted in each of typical examples 3s3r16-A, 3s3r16-B and 3s3r16-O.

TABLE 18

| Lens Configuration | Lens Face | CC | AD | AE | AF | AG |
|---|---|---|---|---|---|---|
| 2s3r14-A | First Face | −0.14929 | 6.760171 | −521.577 | 598.9387 | −8.13137 |
| 2s3r14-B | First Face | −0.57691 | 21.25168 | −912.575 | 1.01E+04 | −138.081 |
|  | Second Face | −0.34354 | −21.2562 | 531.1652 | −32.3798 | −2.23689 |
| 3s3r16-A | First Face | 2.183367 | 5.543179 | −446.337 | 7.72E+03 | −5.41E+04 |
| 3s3r16-B | First Face | 1.408948 | 1.20388 | −178.113 | 2.44E+03 | −1.46E+04 |
|  | Second Face | −4.61986 | −5.68713 | 10.57847 | 800.2823 | −7.13E+03 |
|  | Third Face | −0.59845 | 5.116904 | −248.249 | 5.63E+03 | −3.83E+04 |
| 3s5r16-B | First Face | 0.964507 | 6.503586 | −526.489 | 8.75E+03 | 37.56281 |
|  | Second Face | −3.09849 | −0.79649 | 416.5862 | −8.04E+03 | −147.098 |
|  | Third Face | 0.170983 | 7.44076 | 154.1729 | −2.98E+03 | −50.453 |
| 3s5r18-B | First Face | 0.214623 | 6.390701 | −534.481 | 9.59E+03 | −48.3813 |
|  | Second Face | −2.00688 | −15.1122 | 1.21E+03 | −1.87E+04 | 115.1752 |
|  | Third Face | 0.470522 | −3.40988 | 749.711 | −1.03E+04 | −281.363 |
| 3s5r20-B | First Face | 0.637208 | 15.71136 | −1.31E+03 | 2.80E+04 | −1.08E+05 |
|  | Second Face | −2.07223 | −51.1392 | 2.70E+03 | −3.92E+04 | −1.17E+03 |
|  | Third Face | −0.89189 | −31.7735 | 1.91E+03 | 2.48E+04 | 1.07E+03 |

TABLE 19

|  |  |  | CC | AD | AE | AF | AG |
|---|---|---|---|---|---|---|---|
| 2-sheet configuration | First Face | min | −0.6 | 6 | −950 | 500 | −140 |
|  |  | max | −0.1 | 22 | −500 | 12000 | −7 |
|  | Second Face | min | −0.4 | −22 | 0 | −35 | −3 |
|  |  | max | 0 | 0 | 550 | 0 | 0 |
| 3-sheet configuration | First Face | min | 0.1 | 1 | −1350 | 2400 | −110000 |
|  |  | max | 2.2 | 16 | −160 | 29000 | 50 |
|  | Second Face | min | −5 | −55 | 0 | −40000 | −7200 |
|  |  | max | 0 | 0 | 2800 | 1000 | 120 |
|  | Third Face | min | −1 | −32 | −260 | −11000 | −39000 |
|  |  | max | 0.5 | 8 | 2000 | 25000 | 11000 |

As is obvious from results shown in Table 19, it is preferable that the aspherical coefficient CC satisfies the range −0.6≦CC≦0 in the 2-sheet configuration and that the aspherical coefficient CC satisfies the range −5≦CC≦2.2 in the 3-sheet configuration. Because the coefficients AD to AG depend on the lens radius r, the coefficients AD to AG cannot be determined universally. In an ordinary lens radius (about 0.15 mm to about 0.2 mm) in an image transfer device of this type, it is however preferable that the coefficients AD and AE are set as follows:

|AD|: 0 to 22, |AE|: 0 to 950 in the two-sheet configuration; and

|AD|: 0 to 55, |AE|: 0 to 2,800 in the three-sheet structure.

It is also obvious from results shown in FIG. 16 that resolution MTF in each of Examples (3s3r16-A and 3s3r16-B) according to the invention is improved greatly compared with that in Comparative Example (3s3r16-O). The effect is particularly remarkable when the spatial frequency is high. In comparison between the Example (3s3r16-B) in which all the lens faces are shaped aspherically and the Example (3s3r16-A) in which only the outer lens faces are shaped aspherically, it is further obvious that resolution MTF in the Example in which all the lens faces are shaped aspherically can be improved more greatly.

As described above, in accordance with the third embodiment of the invention, two or three lens array sheets each having convex-convex lens elements arranged in a plurality of rows are laminated on each other or one another. Hence, the number of lens array sheets can be reduced as sufficiently as possible. As a result, easy assembling and reduction in cost and size can be achieved. Moreover, lens faces are partly or wholly shaped aspherically so that the shape of the lens can be optimized. Hence, brightness and high resolution can be achieved.

What is claimed is:

1. An image transfer device comprising:

a lens array laminate forming an erecting unit magnification optical system, said lens array laminate including first predetermined plural number of lens array sheets each of which has convex-convex lens elements arranged in second predetermined plural number of rows and which are in contact and laminated in a direction of a lens optical axis.

2. An image transfer device according to claim 1, wherein:

said lens array sheets have the same specification;

said first predetermined plural number is one of 2 to 4;

said second predetermined plural number is one of 3 to 9;

each of said convex-convex lens elements is made of a transparent material having a refractive index of not lower than 1.45.

3. An image transfer device according to claim 2, wherein:
   each of said lens array sheets has a lens thickness in the range of 0.2 to 6.3 mm;
   the ratio of lens aperture radius to lens thickness in each of said lens array sheets is in a range of from 0.12 to 0.20;
   the ratio of convex face curvature radius to lens thickness in each of said lens array sheets is in a range of from 0.24 to 0.33;
   the first predetermined plural number is 2.

4. An image transfer device according to claim 2, wherein:
   each of said lens array sheets has a lens thickness in the range of 0.2 to 8.0 mm;
   the ratio of lens aperture radius to lens thickness in each of said lens array sheets is in a range of from 0.14 to 0.22;
   the ratio of convex face curvature radius to lens thickness in each of said lens array sheets is in a range of from 0.42 to 0.65;
   the first predetermined plural number is 3.

5. An image transfer device according to claim 2, wherein:
   each of said lens array sheets has a lens thickness in the range of 0.2 to 8.0 mm;
   the ratio of lens aperture radius to lens thickness in each of said lens array sheets is in a range of from 0.18 to 0.29;
   the ratio of convex face curvature radius to lens thickness in each of said lens array sheets is in a range of from 0.75 to 1.10;
   the first predetermined plural number is 4.

6. An image transfer device according to claim 5, wherein the lens thickness of each of said lens array sheets is in a range of from 0.5 mm to 4 mm.

7. An image transfer device according to any claim 5, wherein the second predetermined plural number is one of 4 to 6.

8. An image transfer device according to claim 2, wherein the transparent material has a refractive index in the range of 1.45 to 1.55.

9. An image transfer device according to claim 1, wherein:
   said first predetermined plural number is 2;
   said lens array laminate is formed so that lens faces located on opposite sides and symmetric to each other with respect to a center of said lamination form a symmetrical shape and so that at least two outer lens faces are shaped aspherically.

10. An image transfer device according to claim 9, wherein an aspherical coefficient CC defining a quadratic curved face of revolution which is a base of each of said lens faces shaped aspherically satisfies the relation:

$$-0.6 \leq CC \leq 0.$$

11. An image transfer device according to claim 1, wherein:
   said first predetermined plural number is 3;
   said lens array laminate is formed so that lens faces located on opposite sides and symmetric to each other with respect to a center of said lamination form a symmetrical shape and so that at least two outermost lens faces are shaped aspherically.

12. An image transfer device according to claim 11, wherein an aspherical coefficient CC defining a quadratic curved face of revolution which is a base of each of said lens faces shaped aspherically satisfies the relation:

$$-5 \leq CC \leq 2.2.$$

13. An image transfer device according to claim 1, wherein said image transfer device forms an optical system for an optical printer.

14. An image transfer device according to claim 1, wherein said image transfer device forms an optical system of a scanner.

15. An image transfer device comprising:
   a lens array laminate forming an erecting unit magnification optical system, said lens array laminate including first predetermined plural number of lens array sheets each of which has convex-convex lens elements arranged in second predetermined plural number of rows and which are substantially closely laminated in a direction of a lens optical axis and wherein
   said first predetermined number is 3;
   said lens array laminate is formed so that lens faces located on opposite sides and symmetric to each other with respect to a center of said lamination are set to be equal in curvature radius to each other; and
   said lens array laminate satisfies the relations:

$$R1 \neq R2 \text{ and } R2 \neq R3$$

in which R1 is a curvature radius of outer lens faces in outer lens array sheets, R2 is a curvature radius of inner lens faces in the outer lens array sheets, and R3 is a curvature radius of opposite lens faces in an intermediate lens array sheet.

16. An image transfer device according to claim 15, wherein values of said curvature radii R1, R2 and R3 of said lens faces satisfy the relation:

$$R1 < R3 < R2.$$

17. An image transfer device according to claim 16, wherein a ratio R2/R1 of said curvature radius R2 of said lens faces to said curvature radius R1 of said lens faces satisfies the relation:

$$1 < R2/R1.$$

18. An image transfer device according to claim 16, wherein a ratio R2/R1 of said curvature radius R2 of said lens faces to said curvature radius R1 of said lens faces satisfies the relation:

$$1.1 \leq R2/R1 \leq 10.$$

19. An image transfer device according to claim 16, wherein a ratio R2/R1 of said curvature radius R2 of said lens faces to said curvature radius R1 of said lens faces satisfies the relation:

$$1.3 \leq R2/R1\ 5.$$

20. An image transfer device according to claim 15, wherein:
   said second predetermined plural number is 3 to 9;
   each of said convex-convex lens elements is made of a transparent material having a refractive index of not lower than 1.45.

21. An image transfer device according to claim 20, wherein the transparent material has a refractive index in the range of 1.45 to 1.55.

22. An image transfer device comprising:

a lens array laminate forming an erecting unit magnification optical system, said lens array laminate including first predetermined plural number of lens array sheets each of which has convex-convex lens elements arranged in second predetermined plural number of rows and which are substantially closely laminated in a direction of a lens optical axis and wherein:

said first predetermined plural number is 2 or 3;

said lens array laminate is formed so that lens faces located on opposite sides and symmetric to each other with respect to a center of said lamination form a symmetrical shape and so that at least two lens faces are shaped aspherically.

23. An image transfer device according to claim 22, wherein all the lens faces are shaped aspherically.

* * * * *